March 10, 1942.　　　　I. O. MINER　　　　2,275,638

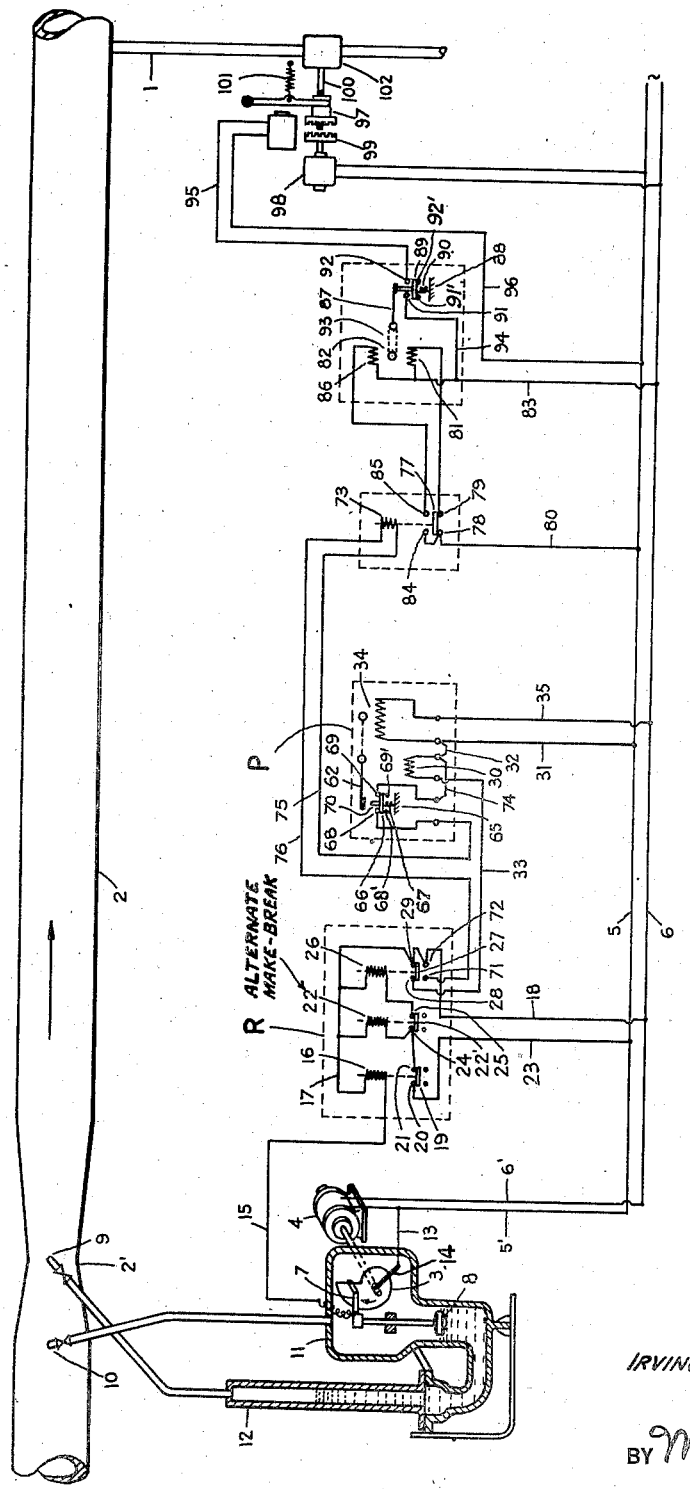

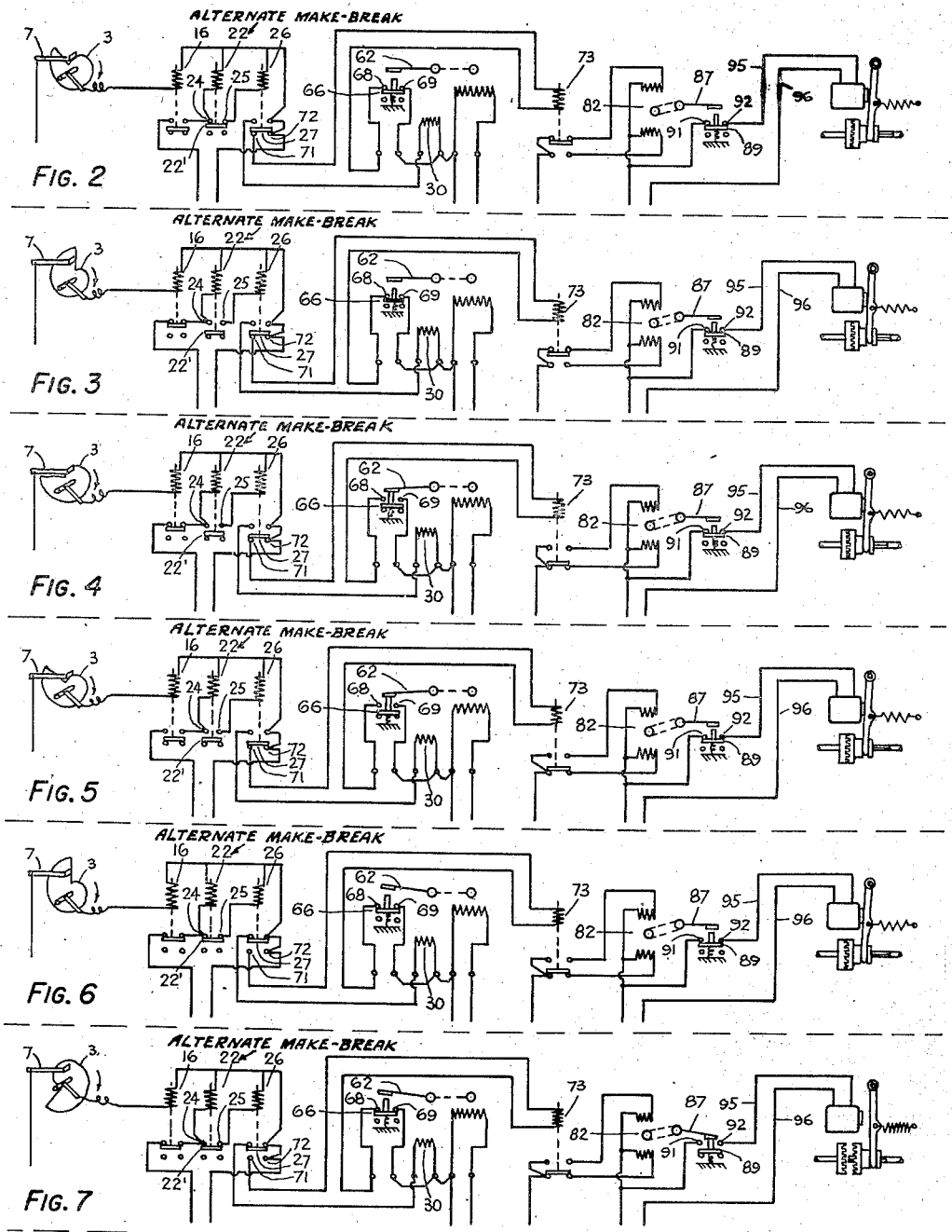

TELEMETERING SYSTEM

Filed July 27, 1940　　　　3 Sheets-Sheet 3

IRVING O. MINER
INVENTOR

BY Maxwell Barus
ATTORNEY

Patented Mar. 10, 1942

2,275,638

UNITED STATES PATENT OFFICE 2,275,638

TELEMETERING SYSTEM

Irving O. Miner, East Providence, R. I., assignor to Builders Iron Foundry, Providence, R. I., a corporation of Rhode Island Application July 27, 1940, Serial No. 347,850

22 Claims. (Cl. 137—165)

This invention relates to telemetering systems wherein cyclical electrical impulses are produced for transmission to remote points. An object of the invention is to provide a novel telemetric system capable of controlling a variable quantity in a unique and especially effective manner. The invention enables the control to be accomplished with precision and over a wide range for any given value of the master or controlling quantity.

A more specific object of the invention is to telemeter electrical impulses of a function of time corresponding to a master quantity (such as the rate of flow of a master or primary fluid) and through said impulses to control a dependent quantity (such as the rate of delivery of another fluid or substance into the primary fluid) in predetermined proportion to said master quantity. The invention provides in this connection for the transmission of supplemental time-function electrical impulses under the control of the first-mentioned impulses, but widely variable in their relation to said first mentioned impulses, for enabling variation over a wide range in the rates of delivery, for example, of a second fluid or substance for any given flow rate of the primary fluid, and for maintaining the desired proportion despite variations in the rate of flow of said primary fluid.

Other features and advantages of the invention will be hereinafter described and claimed.

In the accompanying drawings:

Fig. 1 is a diagrammatic view illustrating an embodiment of the invention applied to the maintaining of the rate of delivery of one fluid in desired proportion to the rate of flow of a master or primary fluid.

Figures 2-7, inclusive, are diagrammatic views illustrating the circuits and positions of the parts in a given example of operating conditions.

Figure 8:
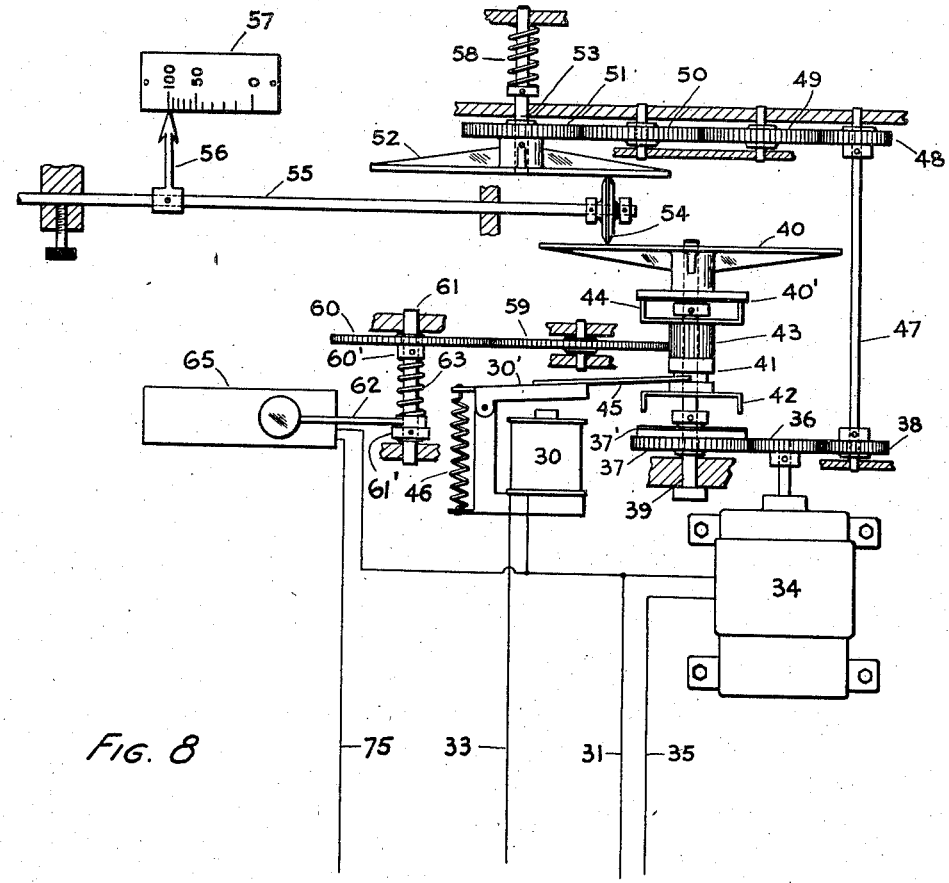
Fig. 8 is a diagrammatic plan view showing an embodiment of a proportioning control mechanism constituting a part of my invention.

Referring to the drawings, an embodiment of the invention is illustrated as applied to the production of a flow of fluid in one conduit 1 in proportion to the flow of fluid in another conduit 2.

Associated with the conduit 2 is a telemetric transmitter of well-known type comprising a cam 3 driven continuously at constant speed by a synchronous motor 4, energized from the current mains 5, 6, to which said motor is shown connected by wires 5', 6'. Cooperating with said cam 3 is a contactor 7 positioned by a float 8 in accordance with the differential pressure between taps 9 and 10 connected to conduit 2. Said contactor 7 is adapted to make contact with the face of the cam 3, during the rotation of the latter, for periods commensurate with the flow rate of the liquid in the conduit 2. In the example shown, the liquid flows in the direction of the arrow in conduit 2 and the differential producer takes the form of a Venturi tube portion 2' in said conduit. The high pressure tap 10 is connected to leg 11 of a conventional U-tube containing a manometric liquid such as mercury, while the low pressure tap 9 is connected to leg 12 of said U-tube. Float 8 rests upon the surface of a manometric liquid and is thus positioned in accordance with the differential pressure between points 9 and 10, or, in other words, in correspondence with the square of the rate of flow of the liquid in the conduit 2. Due to the shape of cam 3, the period of engagement between the face of said cam and the contactor 7 in each cycle of rotation of said cam is proportional to the square root of the differential pressure between points 9 and 10, and is thus proportional to the rate of flow of the liquid in the conduit 2.

The cam 3 is shown connected to the current main 5 by wires 5', 13 and brush 14. Contactor 7 is connected to the main 6 through wire 15, relay 16, and wires 17 and 18. Thus in each cycle of rotation of said cam 3, an electrical impulse of a duration proportional to the rate of flow of the fluid in the conduit 2 is sent over the wire 15, and the relay 16 is energized for the duration of said impulse. Said relay 16 is one of a group of relays R which act to eliminate every other impulse from the transmitter cam 3 and contactor 7, so that only alternate impulses are passed on to the proportioning controller P for utilization as described hereinafter.

More specifically, the relay 16, when energized, attracts its armature 19 into engagement with contacts 20, 21, thereby closing a circuit through a second relay 22, by way of wire 23, said armature and contacts, and wires 17 and 18. The alternate make-break relay 22 is of a well-known type having a ratchet device associated therewith for maintaining its armature 22' engaged with contacts 24, 25 until relay 16 is again energized, whereupon said armature is disengaged from said contacts and remains disengaged therefrom until relay 16 is next energized. In other words, on the first energization of relay 16, the armature 22' of relay 22 is engaged with contacts 24, 25 and remains engaged therewith for the period of a complete rotation of the cam 3, following which said armature is disengaged from said contacts throughout the next cycle of rotation of said cam. In this way, said contacts 24, 25 are closed by said armature in alternate cycles of rotation of said cam but are open in intermediate cycles, so that only alternate impulses from said cam are passed beyond the relay 22. Since relays of the type described with reference to relay 22 are well-known in the art, further description thereof is unnecessary.

As long as the armature 22' is engaged with contacts 24 and 25, and relay 16 is energized, a circuit is closed through wire 23, contact 20, armature 19, contact 21, contact 24, armature 22', contact 25, relay 26, and thence through wires 17 and 18. Relay 26 is thus energized in each alternate cycle of rotation of cam 3 for the duration of the impulse in such alternate cycle.

Relay 26, when energized, attracts its armature 27 into engagement with contacts 28 and 29, thereby closing a circuit through a solenoid 30 of the proportional control apparatus P. Such circuit comprises a wire 31, wire 32, solenoid 30, wire 33, contact 28, armature 27, contact 29, and wire 18. In short, the solenoid 30 is energized for the duration of the impulse in each alternate cycle of rotation of the cam 3.

The proportioning control device P includes a motor 34, such as a synchronous motor which is driven continuously at substantially constant speed by current supplied from the mains 5, 6, by way of wires 31 and 35. Said motor, through gear 36 (Fig. 8), drives a pair of gears 37, 38. Gear 37 is rotatable on a shaft 39, which shaft also has a disk 40 rotatably mounted thereon. Integral with or secured to the gear 37 is a clutch portion 37', while a similar clutch portion 40' rotates with the disk 40. Rotatably mounted on said shaft 39, and also slidable thereon, is a clutch device comprising a hub 41, a clutch element 42 adapted to engage the clutch portion 37' of gear 37, a pinion 43, and a clutch element 44 adapted to engage the clutch portion 40' of disk 40. Said hub, pinion, and clutch elements are integral or secured together so as to move as a unit. For shifting said clutch device along the rod or shaft 39, to engage the clutch portion of either the gear 37 or the disk 40, the armature 30' of the solenoid 30 is provided with an extension 45 suitably bifurcated for engagement with a groove in the hub 41. When said solenoid is energized, the clutch element 42 is engaged with the clutch portion 37' of gear 37, while element 44 is out of engagement with clutch portion 40' of disk 40. On the other hand, when solenoid 30 is de-energized, a spring 46 actuates the armature 30' to shift the clutch device into the position shown in Fig. 8, wherein element 42 is disengaged from gear portion 37' and element 44 is engaged with the disk portion 40'.

The disk 40 is rotated continuously in a direction opposite to that of gear 37. For this purpose the gear 38 is secured to a shaft 47, which also has secured thereto a gear 48. Through gears 49, 50, 51, the gears 38 and 48 drive a disk 52 carried by a shaft 53. Between disk 52 and the aforementioned disk 40 and frictionally engaging said disks, is a roller 54, rotatably mounted on a rod 55 which is slidably adjustable in suitable bearings and carries a pointer 56 cooperating with a suitable scale 57. The disk 52 is resiliently maintained in firm engagement with roller 54, and the latter in turn is pressed firmly against the disk 40, by a spring 58 interposed between a stationary frame piece and a collar on the shaft 53.

The speed of rotation of the disk 40 may be varied as desired by shifting the rod 55 to bring the roller 54 to different positions between the disks 40 and 52. In Fig. 8, the roller 54 is so positioned that the speed of disk 40 is equal to that of disk 52. The scale 57 may, as shown, be conveniently graduated to indicate speeds of disk 40 as percentages of the speed of disk 52, the pointer 56 indicating 100% on said scale when said speeds are equal. The rod 55 may be adjusted manually to obtain the desired speed of disk 40 and the scale 57 may be graduated in any appropriate manner so that the speed of said disk may be exhibited thereon within the desired range.

Meshing at all times with the clutch pinion 43 is a gear 59 which in turn meshes with a gear 60 mounted on a shaft 61. A switch-operating arm 62 is mounted rotatably on the shaft 61 and is driven by said gear 60. The driving of said arm may be advantageously accomplished through the medium of a compression spring 63 arranged to press the hub of arm 62 into frictional engagement with collar 61'. Said arm 62 carries a screw 64 or other adjustable projection which is adapted to control a suitable switch 65. The latter may comprise a contact bar 66 (Fig. 1), urged by a spring 67 into engagement with a pair of contacts 68, 69, said bar having a projection 70 engageable by the projection 64 of the switch arm 62.

Energization of solenoid 30 clutches the gear 60 to the gear 37 with resultant movement of arm 62 away from an initial position wherein said arm engages the projection 70 and maintains contact bar 66 a slight distance out of engagement with contacts 68, 69. As said arm commences to move away from said position, spring 67 promptly brings said bar 66 into engagement with said contacts, in which position said bar remains until again moved out of engagement with said contacts by the return of the arm 62 to its initial position. Said arm 62 continues to move away from said initial position until the solenoid 30 is de-energized, whereupon gear 60 is clutched to disk 40 and said arm is moved in the opposite direction until it again engages projection 70 and disengages bar 66 from the associated contacts. Throughout the period between the start of the movement of said arm 62 away from its initial position and its return thereto, the switch bar 66 bridges the contacts 68 and 69. This period equals the duration of the impulse which causes energization of the solenoid 30 and a subsequent interval which bears a predetermined relation to said impulse duration, depending upon the setting of the roller 54.

Movement of bar 66 away from contacts 68, 69 is limited by the engagement of said bar with suitable stops 68', 69', which also prevent further movement of the arm 62 by the disk 40. Slippage then occurs between switch arm 62 and collar 61' until solenoid 30 is again energized.

In circuit with said contacts 68, 69, and with back contacts 71, 72 of the relay 26, is a relay 73 which governs the sending to a control device of signals of predetermined duration with respect to those sent from the transmitter cam 3 and contactor 7. It will be noted that said relay 73 is not energized even though the switch bar 66 bridges the contacts 68, 69, unless the relay 26 is deenergized so that its armature 27 bridges the contacts 71, 72. In other words, relay 73 is de-energized during the movement of switch arm 62 away from bar 66, since relay 26 is energized during that period; but said relay 73 is energized throughout the ensuing return movement of arm 62, until said arm moves the switch bar 66 out of engagement with its associated contacts 68, 69. This period of energization of said relay 73 depends upon the speed of the return movement of said arm 62, as determined by the setting of the roller 54.

The circuit through relay 73 may be traced as follows: from wire 31, through wire 32, wire 74, contact 69, switch bar 66, contact 68, wire 75, relay 73, wire 76, contact 71, armature 27, contact 72, and wire 78.

When relay 73 is de-energized, its armature 77 bridges a pair of back contacts 78, 79, thereby closing a circuit from wire 80, through said contacts and armature, thence through winding 81 of a reversible motor 82, and then through wire 83. Motor 82 thereupon turns in a given direction. When, however, relay 73 is energized, its armature bridges a pair of front contacts 84, 85, and closes a circuit through an opposed winding 86 of motor 82, causing said motor to turn in the opposite direction.

Figures 9, 10:
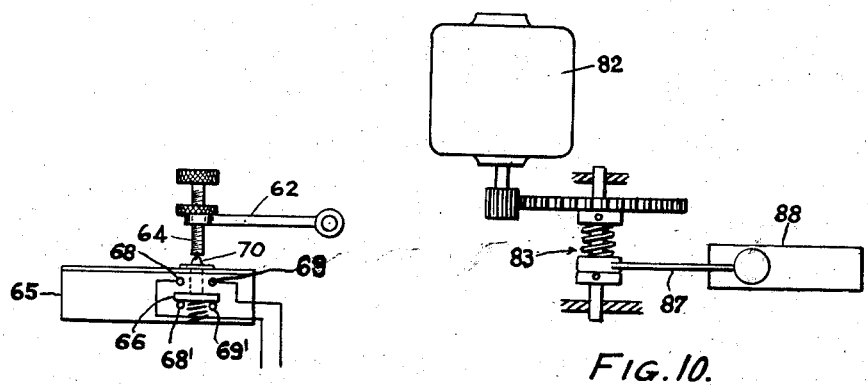
Fig. 9 is a view of a detail.
Figure 10 is a view of a further detail.

Said motor 82 drives a switch arm 87 which controls a switch 88 in the same manner as arm 62 controls the switch 65. Said switch 88 comprises a contact bar 89 which is urged by a spring 90 into engagement with a pair of contacts 91, 92. Said arm 87 may be driven by motor 82 in any convenient way through a suitable friction means 93. For example, as will be readily apparent, friction means 93 may be interposed between the shaft of motor 82 and a gear or other driving member for arm 87. Of course, if desired, the same spring pressed friction means may be interposed between arm 87 and its driving member that is shown interposed between arm 62 and gear 60, as shown in Figure 10.

In its initial position, the switch arm 87, as shown in Fig. 1, maintains the bar 89 slightly out of engagement with contacts 91, 92 and against suitable stops 91', 92'. As soon, however, as relay 73 is energized, a circuit is closed through winding 86 of motor 82 and the latter drives the arm 87 away from bar 89, the latter immediately bridging the contacts 91, 92 at the beginning of said movement of said arm 87. Said movement of arm 87 continues as long as the relay 73 is energized, or, in other words, for the duration of the return movement of switch arm 62 into engagement with bar 66. As soon as said return movement of arm 62 is completed, the circuit through relay 73 is broken at contacts 68, 69, and armature 77 of relay 73 engages the back contacts 78, 79, energizing the winding 81 of motor 82 and causing said motor to return the arm 87 into the position shown in Fig. 1, wherein the bar 89 is disengaged from contacts 91, 92 and is moved against its stops 91', 92'. Slippage then occurs through the friction means between motor 82 and arm 87 until relay 73 is again energized.

The duration and extent of the return movement of the arm 87 are the same as the duration and extent of its movement away from its initial position; and since the duration of said movement away from said initial position equals the duration of the return movement of switch arm 62, it will be seen that the bar 89 remains engaged with contacts 91, 92 for a period equal to twice the duration of said return movement of the switch arm 62. Throughout this period of engagement between bar 89 and said contacts an impulse is sent in a circuit comprising wire 83, wire 94, said bar and contacts, wire 95, and wire 96, the duration of which impulse is twice the duration of the aforementioned return movement of arm 62.

The impulses in the circuit including wires 95 and 96 may effect any desired control. In the present embodiment they are illustrated as controlling the flow of fluid through a pipe line 1 into the conduit 2. For this purpose said impulses may, as shown, be applied to the energization of an electromagnet clutch 97, interposed between a continuously running constant speed motor 98 and a pump 102 in the pipe line 1. Said motor rotates continuously a clutch element 99, with which element the electromagnetic clutch member 97 is engaged for the duration of the impulse in the wires 95 and 96. Said clutch member 97 is splined on the pump operating shaft 100, and is slidable longitudinally thereon; so that pump 102 is operated for the duration of each impulse in said wires 95, 96. Spring 101 disengages the clutch member 97 from element 99 as soon as the impulse ceases.

Since the duration of each impulse in the wires 95, 96 is twice as long as the duration of the return of arm 62 to its initial position, and since the time of such return of said arm 62 may be varied by changing the position of the roller 54, it will be apparent that the duration of said impulses may be widely varied with respect to the durations of the impulses from the transmitter cam 3. Thus, if roller 54 is in the position shown in Fig. 8 wherein the periods of return of switch arm 62 to its initial position are 100% of the durations of the impulses from transmitter cam 3, the durations of the impulses in wires 95, 96 are twice those of the signals from said transmitter cam. Thereby the pump 102 may be operated, in the period of each of said impulses in wires 95, 96, through a given extent at half the speed required if said impulses were half as long. In other words, the pump may be operated at normal speed through the same extent as would be obtained by doubling its speed for half the duration of said impulses. In this way increase of speed of the pump may be avoided. If desired, the roller 54 may be shifted still further to the left in Fig. 8, thereby additionally increasing the periods of the impulses in the wires 95, 96.

It will further be observed that the ratio of the rate of flow of the liquid in pipe 1 to that in conduit 2 may be varied through an extremely wide range by adjustment of the roller 54. For example, if the roller is shifted to a position corresponding to the point marked 50 on the scale 57, the period of the return of arm 62 to its initial position will be 50% of the duration of the impulse from the transmitter cam, and the duration of the impulse in wires 95, 96 will be equal to that of said transmitter cam signal. Pump 102 will then be operated through half the extent that it is operated when pointer 56 stands at 100 on scale 57. Movement of pointer 56 further to the right in Fig. 8 will further diminish the extent of operation of said pump. The proportion of rate of flow of fluid through pipe 1 to the rate of flow in conduit 2 may thus be varied as desired by shifting the rod 55 to bring pointer 56 to the desired point on scale 57, and the rate of injection of fluid through pipe 1 into conduit 2 may be varied widely for any given rate of flow in conduit 2 by appropriately shifting said rod 55.

In short, the above-described embodiment provides signals in wires 95, 96 to control the feeding of a supplementary substance (in pipe 1), first in proportion to the rate of flow of a primary substance (in conduit 2), and second at variable proportions (as determined by the setting of roller 54). By manipulating the adjustment of said roller 54 it is possible to change the rate of feed of the supplementary substance over a very considerable range even for the same rate of flow of the primary substance, and the proportion thus set by the position of said roller will be maintained as the flow rate of the primary substance changes.

Fig. 1 shows the condition of the circuits at the commencement of an impulse from cam 3 in the first transmitting cycle. All of the relays 16, 22, and 26 are energized, and switch arm 62 has just moved away from projection 70, resulting in engagement of contact bar 66 with contacts 68 and 69. However, relay 73 is de-energized, since armature 27 of relay 26 is disengaged from contacts 71, 72. Switch arm 87 holds contact bar 89 out of engagement with contacts 91, 92.

Assuming, by way of illustration, that the cycle of rotation of cam 3 is 60 seconds, that the duration of the maximum impulse from said cam is 53 seconds, that contactor 7 is set to provide such maximum impulse, and that roller 54 is set at a point corresponding to the 100% designation on scale 57, the sequence of further operations is illustrated in Figures 2-7.

Figure 2 shows the condition of the circuits at the time when the cam 3 has continued its rotation from its position in Figure 1 to a position in which the impulse (53 seconds) from said cam ceases. It will be noted that relays 16, 22 and 26 are now de-energized (relay armature 22' being, however, held closed for the completion of the 60 seconds of the cycle by a ratchet device, as hereinbefore explained). Solenoid 30 of the proportioning control apparatus is now de-energized, due to the de-energization of relay 26, and arm 62 now commences its return movement towards its initial position. The engagement of armature 27 with contacts 71, 72 pursuant to de-energization of relay 26, has closed a circuit through relay 73, whereupon motor 82 commences moving switch arm 87 away from its initial position, so that contact bar 89 engages contacts 91, 92 and the impulse circuit is closed over wires 95, 96.

In Fig. 3 the cam 3 is shown commencing its second cycle of rotation, initiating a new impulse in cooperation with contactor 7. Relay 16 is again energized, but the armature 22' of relay 22 is now in its lower position, out of engagement with contacts 24 and 25, as hereinbefore explained and remains in that position throughout said second cycle. Since said armature is not in engagement with said contacts 24, 25, the relay 26 and solenoid 30 are de-energized throughout the second cycle aforesaid. Switch arm 62, which commenced its return movement at the end of 53 seconds in the first cycle, continues said return movement, so that contact bar 66 remains engaged with contacts 68, 69, relay 73 remains energized, and switch arm 87 continues moving away from its initial position. Contact bar 89 remains engaged with contacts 91, 92, and the impulse continues in wires 95, 96.

Fig. 4 shows the circuit conditions at the end of 46 seconds in said second cycle. At this time the arm 62 completes its return movement to its initial position (which return movement occupied 53 seconds in the example under consideration— i. e., the last seven seconds of the first cycle and the first 46 seconds of the second cycle). Contact bar 66 is now disengaged from contacts 68, 69, and relay 73 is de-energized. Switch arm 87 has now moved away from its initial position for 53 seconds and motor 82 starts returning said switch arm towards its initial position; but contact bar 89 remains engaged with contacts 91, 92, and the impulse in wires 95, 96 continues.

In Fig. 5, the cam 3 is at the point in the second cycle wherein the 53 second impulse in that cycle ceases. Relay 16 is de-energized, and relays 22, 26, solenoid 30, and relay 73 remain de-energized. Switch arm 87, which commenced its return movement at the end of 46 seconds in said second cycle, continues said return movement. The impulse continues in wires 95, 96.

Fig. 6 shows the circuits at the beginning of the third cycle of rotation of cam 3. A third impulse is initiated in this position of said cam, and relays 16, 22, and 26 are energized, as is also solenoid 30. Switch arm 62 now again starts moving away from its initial position, and bar 66 again engages contacts 68 and 69. However, relay 73 remains de-energized since armature 27 of relay 26 is out of engagement with contacts 71, 72. Switch arm 87 continues its return movement and the impulse continues in wires 95, 96.

Fig. 7 shows the conditions at the end of 39 seconds in the third cycle, at which time switch arm 87 returns to its initial position and disengages bar 89 from contacts 91 and 92, terminating the impulse in the wires 95, 96. Said impulse, which started at the end of 53 seconds in the first cycle and terminated at the end of 39 seconds in the third cycle, has continued for 106 seconds, or double the impulse of 53 seconds from the cam 3 in the first cycle.

Assuming the impulse from the cam 3 in said third cycle to have a duration of 53 seconds, the condition of the circuits at the end of said 53 seconds will be the same as shown in Figure 2, and the sequences of operations will be as above indicated.

From the foregoing specific illustration of operations of the embodiment of the invention disclosed, its operation under various conditions will be apparent.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetering system, means for cyclically creating impulses of durations corresponding with values of a quantity, and means responsive to said impulses for transmitting other impulses the durations of which differ in predetermined proportion from those of the first mentioned impulses.

2. In a telemetering system, means for cyclically creating impulses of durations corresponding with values of a quantity, and means responsive to said impulses for transmitting other impulses the durations of which are greater than those of the first mentioned impulses.

3. In a telemetering system, means for cyclically creating impulses of durations corresponding with values of a quantity, signal-controlling means brought into action in response to alternate impulses from said creating means, and means controlled by said signal-controlling means for transmitting of other impulses of durations bearing a predetermined relation to those of the first mentioned impulses.

4. In a telemetering system, means for cyclically creating impulses of durations corresponding with values of a quantity, impulse-controlling means brought into action in response to alternate impulses from said creating means, means controlled by said impulse-controlling means for transmitting other impulses of durations bearing a predetermined relation to those of the first mentioned impulses, and means for varying said relation.

5. In a telemetering system, means for cyclically creating impulses of durations corresponding with values of a quantity, means responsive to said impulses for transmitting other impulses the durations of which bear a predetermined relation to those of the first mentioned impulses and means for varying said relation.

6. In a telemetering system, means for creating, in cycles of uniform time periods, impulses of durations corresponding with the values of a quantity, switch means, means responsive to certain of said impulses for operating said switch means in cycles, the periods of which are multiples of those of the first mentioned cycles, and means controlled by said switch means for cyclically transmitting other impulses.

7. In a telemetering system, means for cyclically creating impulses of durations corresponding with values of a quantity, switch means, means responsive to alternate ones of said impulses for operating said switch means in cycles the periods of which are double the periods of the first mentioned cycles, and means controlled by said switch means for transmitting other impulses.

8. In a telemetering system, means for cyclically creating impulses of durations corresponding with values of a quantity, substantially constant speed motor means, a movable member, means responsive to certain of said impulses for causing said motor means to operate said member in a given direction away from a normal position for the duration of the impulse and thereafter to return said element to said position, a second member, means controlled by the first member for causing movement of the second member away from a normal position during the return of the first member to its normal position and for thereafter returning the second member to its normal position, and means controlled by said second member for transmitting an impulse during both the movement of said second member away from its normal position and its return thereto.

9. In a telemetering system, means for cyclically creating impulses of durations corresponding with values of a quantity, substantially constant speed motor means, a movable member, means responsive to certain of said impulses for causing said motor means to operate said member in a given direction away from a normal position for the duration of the impulse and thereafter to return said element to said position, and means controlled by said member for transmitting an impulse for the period determined by the return movement of said member.

10. In a telemetering system, means for cyclically creating impulses of durations corresponding with values of a quantity, substantially constant speed motor means, a movable member, means responsive to certain of said impulses for causing said motor means to operate said member in a given direction away from a normal position for the duration of the impulse and thereafter to return said element to said position, other motor means, means controlled by said member for causing operation of said other motor means in one direction during said return of said member and in the opposite direction for a period equal to that of said return, and impulse transmitting means controlled by said other motor means.

11. In a telemetering system, means for cyclically creating impulses of durations corresponding with values of a quantity, substantially constant speed motor means, a movable member, clutch means between said motor means and said member, means responsive to certain of said impulses for operating said clutch means to a position in which said motor means drives said member in a given direction and for operating said clutch means on cessation of the impulse to a position wherein said motor drives said member in the opposite direction, and impulse transmitting means controlled by said member.

12. In a telemetering system, means for cyclically creating impulses of durations corresponding with values of a quantity, substantially constant speed motor means, a movable member, clutch means between said motor means and said member, means responsive to certain of said impulses for operating said clutch means to a position in which said motor means drives said member in a given direction and for operating said clutch means on cessation of the impulse to a position wherein said motor drives said member in the opposite direction, other impulse creating means, and means for causing operation of the last-mentioned impulse creating means for the period of the movement of said member in said opposite direction and for an additional period of substantially the same duration.

13. In a telemetering system, means for cyclically creating impulses of durations corresponding with values of a quantity, substantially constant speed motor means, a movable member, clutch means between said motor means and said member, means responsive to certain of said impulses for operating said clutch means to a position in which said motor means drives said member in a given direction and for operating said clutch means on cessation of the impulse to a position wherein said motor drives said member in the opposite direction, reversible motor means, means for causing said reversible motor means to operate in one direction during the period of the movement of said member in said opposite direction, and for causing said reversible motor means to then operate for a like period in the opposite direction, and means controlled by said motor for sending an impulse during the movement of said motor in both of said directions.

14. In a telemetering system, means for cyclically creating impulses of durations corresponding to values of a quantity, a circuit controlling member, a relay energized by alternate ones of said impulses, constant speed motor means, clutch means between said motor means and said member, connections between said relay and said clutch means for shifting said clutch means to cause said motor means to operate said member in a given direction during the period of energization of said relay, means responsive to deenergization of said relay for shifting said clutch means to cause said motor to operate said member in the opposite direction, a relay in the circuit controlled by said member, means responsive to deenergization of the first relay for energizing the second relay for the period of the movement of said second member in said opposite direction, and impulse-creating means controlled by said second relay.

15. In a telemetering system, means for cyclically creating impulses of durations corresponding to values of a quantity, a circuit controlling member, a relay energized by alternate ones of said impulses, constant speed motor means, clutch means between said motor means and said member, connections between said relay and said clutch means for shifting said clutch means to cause said motor means to operate said member in a given direction during the period of energization of said relay, means responsive to deenergization of said relay for shifting said clutch means to cause said motor to operate said member in the opposite direction, a relay in the circuit controlled by said member, means responsive to deenergization of the first relay for energizing the second relay for the period of the movement of said second member in said opposite direction, reversible motor means, means controlled by said second relay for causing said motor means to operate in one direction, when said relay is energized and for causing said reversible motor means to operate in the opposite direction when said relay is deenergized, and means controlled by said reversible motor means for sending an impulse during operation of said motor means in both directions.

16. In a telemetering system, means for cyclically creating impulses of durations corresponding with values of a quantity, substantially constant speed motor means, a movable member, clutch means between said motor means and said member, means responsive to certain of said impulses for operating said clutch means to a position in which said motor means drives said member in a given direction and for operating said clutch means on cessation of the impulse to a position wherein said motor drives said member in the opposite direction, means for varying the speed of operation of said member in said opposite direction, and impulse transmitting means controlled by said member.

17. In a telemetering system, means for cyclically creating impulses corresponding to values of a quantity, substantially constant speed motor means, a movable member, means responsive to an impulse for causing said motor means to drive said member in a given direction for a period proportional to the quantity value represented by said impulse and for then causing said motor means to return said member to a given position, and means controlled by said member for sending an impulse corresponding to a multiple of the period of the return movement of said member.

18. In a telemetering system, means for cyclically creating impulses corresponding to values of a quantity, substantially constant speed motor means, a movable member, means responsive to an impulse for causing said motor means to drive said member in a given direction for a period proportional to the quantity value represented by said impulse and for then causing said motor means to return said member to a given position, means controlled by said member for sending an impulse corresponding to a multiple of the period of the return movement of said member, and means for varying the speed of said return movement.

19. In a telemetering system, means for cyclically creating impulses corresponding to values of a quantity, substantially constant speed motor means, a movable member, clutch means between said member and said motor means, a relay responsive to certain of said impulses for controlling said clutch means to cause said motor means to operate said member in one direction for a period corresponding to the quantity value represented by the impulse and to thereafter return said member to a given position, means for preventing the impulses in alternate cycles from affecting said relay, and impulse transmitting means controlled by said member.

20. In a telemetric control system, means for cyclically creating impulses corresponding to values of a quantity, means controlled by alternate ones of said impulses for creating impulses of durations bearing a predetermined relation to the durations of the first mentioned impulses, and means governed by the second mentioned impulses for controlling a quantity.

21. In a telemetric control system, means for cyclically creating impulses corresponding to values of a quantity, a movable member, means controlled by each of a plurality of said impulses for moving said member in one direction for a period corresponding to the quantity value represented by the impulse and for then returning said member to a given position, means controlled by said member for producing other impulses during a period which is a multiple of the period of return of said member to said position, and means governed by said other impulses for controlling a quantity.

22. In a telemetric proportioning system, means responsive to the rate of delivery of a substance for cyclically creating impulses corresponding to said rate of delivery, a movable member, means responsive to each of a plurality of said impulses for moving said member in one direction for a period corresponding to the quantity value and for then returning said member to a given position, means for preventing alternate ones of said impulses from affecting said moving means, means controlled by the return movement of said member for producing other impulses, means for varying the speed of return of said member, and means governed by said other impulses for controlling the rate of delivery of another substance.

IRVING O. MINER.